(12) United States Patent
Wiebe

(10) Patent No.: US 11,447,060 B2
(45) Date of Patent: Sep. 20, 2022

(54) DRIVE ATTACHMENT FOR A RATCHET-TYPE LOAD BINDER TO ENABLE SELECTIVE DRIVING THEREOF WITH A HANDHELD POWER TOOL

(71) Applicant: Gerald Wiebe, Saskatoon (CA)

(72) Inventor: Gerald Wiebe, Saskatoon (CA)

( * ) Notice: Subject to any disclaimer, the term of this patent is extended or adjusted under 35 U.S.C. 154(b) by 0 days.

(21) Appl. No.: 17/425,607

(22) PCT Filed: Jan. 30, 2020

(86) PCT No.: PCT/CA2020/050109
§ 371 (c)(1),
(2) Date: Jul. 23, 2021

(87) PCT Pub. No.: WO2020/154808
PCT Pub. Date: Aug. 6, 2020

(65) Prior Publication Data
US 2022/0097594 A1 Mar. 31, 2022

Related U.S. Application Data

(60) Provisional application No. 62/799,204, filed on Jan. 31, 2019.

(51) Int. Cl.
*B60P 7/08* (2006.01)
*F16G 11/12* (2006.01)
*F16G 15/00* (2006.01)

(52) U.S. Cl.
CPC .............. *B60P 7/083* (2013.01); *F16G 11/12* (2013.01); *F16G 15/00* (2013.01)

(58) Field of Classification Search
CPC ........ B60P 7/083; B60P 7/0838; F16G 11/12; F16G 15/00
See application file for complete search history.

(56) References Cited

U.S. PATENT DOCUMENTS 4,830,339 A * 5/1989 McGee ................... F16G 11/12
403/44
7,451,962 B1* 11/2008 Kennedy ................. F16G 11/12
254/233
(Continued)

*Primary Examiner* — Robert Sandy
*Assistant Examiner* — Louis A Mercado
(74) *Attorney, Agent, or Firm* — Christopher J. Dynowski; Ryan W. Dupuis; Ade & Company, Inc.

(57) ABSTRACT

An attachment for a ratchet-type load binder includes a mounting frame arranged for mounting to the load binder at a location registered with a ratchet mechanism thereof, a slot defined by the mounting frame and arranged to extend angularly of the axis of the ratchet gear so as to be adapted to receive a handle of the ratchet mechanism in rotary movement relative to a body of the load binder, and a transmission member having a shaft extending along an axis of rotation of the transmission member and transmission elements carried on the shaft and projecting outwardly therefrom for meshing with the teeth of the ratchet gear. It is one aspect of the invention that the transmission member is movable from a drive position in which the transmission member meshes with the ratchet gear to an idle position in which the ratchet gear can rotate freely of the transmission member, so that conventional operation of the ratchet mechanism with the handle is still available without removing the attachment. It is another aspect of the invention that the mounting frame has a pair of separable portions so that the attachment can be mounted to an existing load binder by connection of the separable portions to one another when respectively located on the body of the load binder.

11 Claims, 5 Drawing Sheets

(56) References Cited

U.S. PATENT DOCUMENTS

| | | | | |
|---|---|---|---|---|
| 7,552,913 B1* | 6/2009 | Amoss | .................... | F16G 11/12 |
| | | | | 403/44 |
| 8,152,139 B2* | 4/2012 | Wang | ...................... | B60P 7/083 |
| | | | | 254/218 |
| 8,166,831 B2* | 5/2012 | Ruan | ...................... | B60P 7/083 |
| | | | | 73/862.42 |
| 9,103,405 B2* | 8/2015 | Smetz | ..................... | F16B 39/12 |
| 9,561,838 B1* | 2/2017 | Byers | ...................... | F16G 11/12 |
| D893,968 S * | 8/2020 | Robins | ............................ | D8/44 |
| 10,752,156 B2* | 8/2020 | Ruan | ...................... | B60P 7/083 |
| 2014/0326935 A1* | 11/2014 | Chao | ...................... | B60P 7/083 |
| | | | | 254/235 |
| 2018/0209511 A1* | 7/2018 | Stephens | ................ | F16G 11/12 |
| 2018/0298986 A1* | 10/2018 | Rolof | ...................... | B60P 7/083 |
| 2018/0363729 A1* | 12/2018 | Stephens | ................ | F16G 3/006 |

* cited by examiner

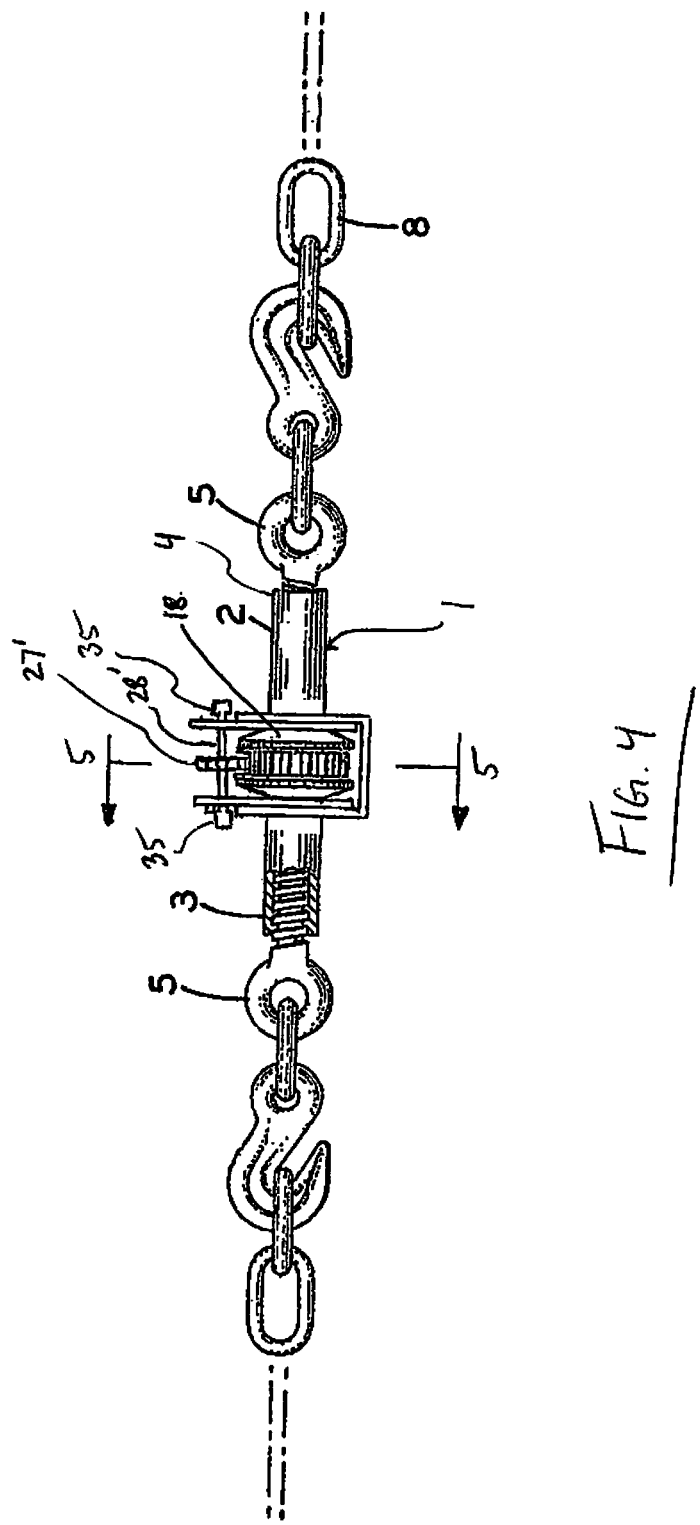

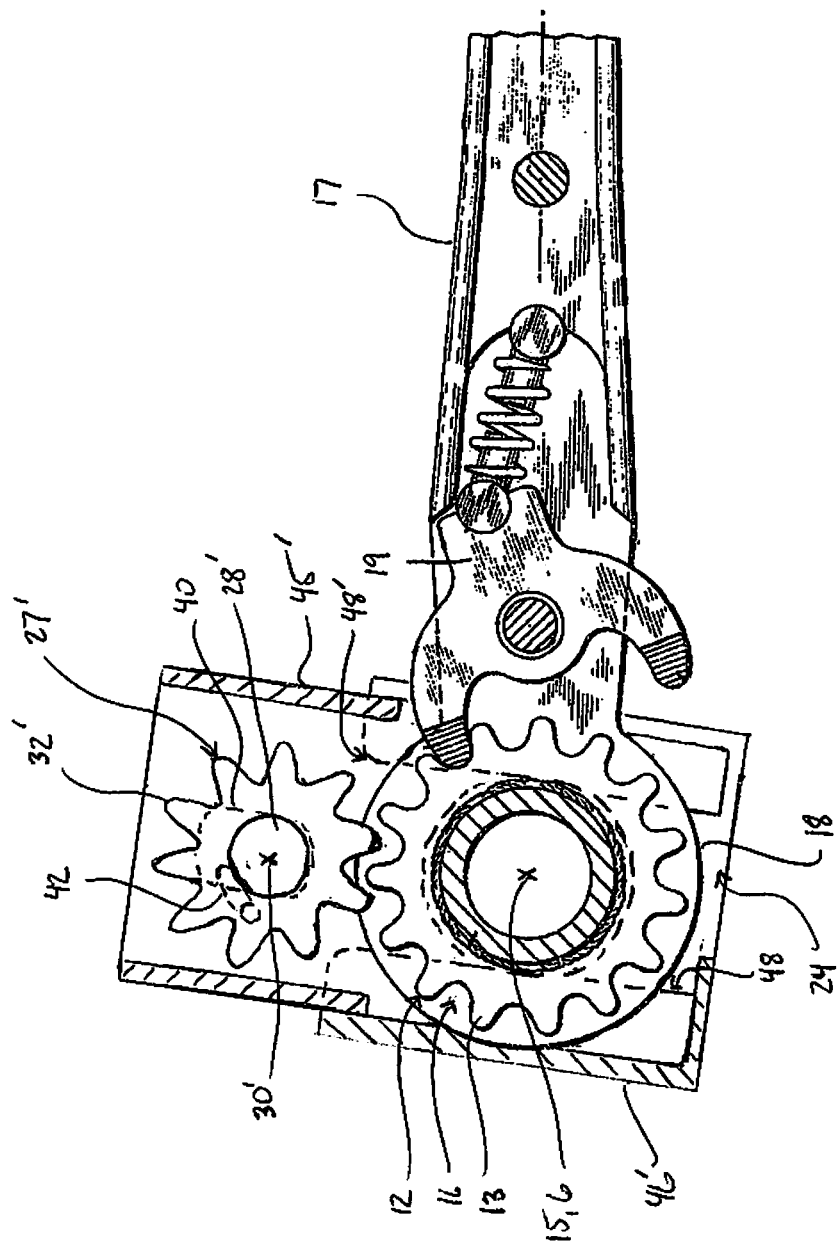

US 11,447,060 B2

DRIVE ATTACHMENT FOR A RATCHET-TYPE LOAD BINDER TO ENABLE SELECTIVE DRIVING THEREOF WITH A HANDHELD POWER TOOL

This application is a national phase filing of PCT/CA2020/050109 and claims priority from U.S. Provisional Application Ser. No. 62/799,204 filed Jan. 31, 2019.

FIELD OF THE INVENTION

The present invention relates generally to an assembly for a ratchet-type load binder that is arranged to transmit rotary motion of a handheld power tool to drive extension and retraction of opposite attachment members of the load binder, and more particularly to such an assembly comprising a worm gear arranged to mesh with teeth of a ratchet gear of the load binder which still permits use of a handle of the load binder to manually drive movement the extension and retraction of the attachment members.

BACKGROUND

Load binders are commonplace tools used when transporting cargo using a flat deck to tension cables with openings spaced along their length, such as those defined by links of a chain, which secure the cargo against a top surface of the flat deck. One popular type of load binder is the ratchet-type which includes a built-in ratchet mechanism to operate the load binder, that is, to effect extension and retraction of opposite attachment members each moving in an opposite direction to the other.

Typically there are at least three steps in the process of securing a cargo load with a chain using a ratchet-type load binder:

1. Extend the attachment members of the load member, which typically are in the form of hooks, from a fully retracted condition suitable for storage. It is recommended that a load binder is stored in a fully closed position, in other words a fully retracted position, so as to protect internal threads of the load binder which carry each of the movable attachment members from damage whether physical or chemical (e.g. rusting). The attachment members must be extended from the fully retracted condition before being used to exert tension on the chain.

2. Attach the load binder to the chain, each movable attachment member thereof to spaced links along the chain.

3. Tension the chain by turning the ratchet handle so as to retract the attachment members.

One disadvantage of ratchet-type load binders is that several strokes of a handle of the ratchet mechanism are needed for a single rotation of a ratchet gear of the mechanism. This is further exacerbated when there is limited space on the flat deck within which to swing the ratchet handle, thus further increasing the number of strokes of the handle to achieve the desired tension on the chain.

SUMMARY OF THE INVENTION

According to an aspect of the invention there is provided a load binder attachment for a ratchet-type load binder.

The ratchet-type load binder has a longitudinally extending tubular body receiving at either opposite end thereof a movable attachment member of the load binder adapted for opposite movement to one another along a longitudinal axis of the body for tensioning a cable to which the movable attachment members are connected. The cable is formed by a plurality of linked annular elements.

The load binder includes a ratchet mechanism adapted to drive the opposite movement of the attachment members. The ratchet mechanism includes a ratchet gear defining a plurality of radially outwardly projecting teeth around its circumference and mounted to the body so that an axis of the ratchet gear which is encircled by the teeth is oriented parallel to the longitudinal axis of the body. A plurality of recesses are respectively defined between each adjacent pair of the teeth. A handle of the ratchet mechanism extends transversely from the body and is supported thereon for rotary movement relative to the body about the axis of rotation of the ratchet gear. A pawl is operatively supported on the handle for selectively engaging the ratchet gear so that the rotary movement of the handle relative to the body acts to drive the opposite movement of the attachment members.

The load binder attachment comprises:

a mounting frame arranged for mounting to the load binder at a location registered with the ratchet mechanism;

a slot defined by the mounting frame and extending angularly of the axis of the ratchet gear so as to be adapted to receive the handle of the ratchet mechanism in the rotary movement relative to the body of the load binder;

a transmission member having a shaft extending along an axis of rotation of the transmission member and transmission elements carried on the shaft and projecting outwardly therefrom for meshing with the teeth of the ratchet gear, the transmission member being supported on the mounting frame so as to be rotatable about the axis of the transmission member;

a coupler carried at one end of the shaft of the transmission member for connecting to a rotary drive member of a handheld power tool so as to drive rotation of the transmission member;

the transmission member being movable between a drive position in which the transmission elements are arranged at a location for contacting the teeth of the ratchet gear and effecting rotation of the ratchet gear upon the rotation of the transmission member and an idle position in which the transmission elements are arranged to be at spaced locations from the recesses so as to be free from meshing with the teeth, such that the transmission member is selectively engageable with the ratchet gear for selectively driving the opposite movement of the attachment members of the load binder.

That is, in the drive position the transmission elements are located in the recesses of the ratchet gear so as to mesh with the teeth thereof such that the rotation of the transmission member effects rotation of the ratchet gear.

This arrangement provides a user the option of driving the opposite movement of the attachment members either using the handheld power tool or the handle of the ratchet mechanism which is operable only when the transmission member is not in meshing relation with the ratchet gear.

In the illustrated arrangements, the transmission member is disposed at an angularly spaced location from the slot.

In one arrangement, the transmission member is a worm gear such that the transmission elements are defined by a helical flight, and in the drive position the axis of rotation of the worm gear is oriented so as to be substantially tangential to the circumference of the ratchet gear.

In such an arrangement, preferably the worm gear is arranged for pivotal movement between the drive and idle positions.

In such an arrangement, preferably a pivot axis about which the worm gear is pivotal in the movement between the drive and idle positions is spaced from the axis of the ratchet gear, is oriented substantially parallel thereto and is substantially coplanar therewith.

In another arrangement, the transmission member comprises a sprocket such that the transmission elements are defined by teeth of the sprocket spaced angularly of the axis of rotation of the transmission member, and in the drive position the axis of rotation of the transmission member is oriented so as to be substantially parallel to and substantially coplanar with the axis of the ratchet gear.

In an arrangement, the transmission member is biased to the idle position and the attachment further includes a retention element movably mounted on the mounting frame to selectively retain the transmission member in the drive position.

In an arrangement, the attachment further includes a retention element movably mounted on the mounting frame to selectively retain the transmission member in the drive position.

In the illustrated arrangements, there is provided a respective one of the coupler at each one of two longitudinally spaced and opposite ends of the shaft.

According to another aspect of the invention there is provided a load binder attachment for the ratchet-type load binder as described hereinbefore, comprising:

a mounting frame arranged for mounting to the load binder at a location registered with the ratchet mechanism;

a slot defined by the mounting frame and arranged to extend angularly of the axis of the ratchet gear so as to be adapted to receive the handle of the ratchet mechanism in the rotary movement relative to the body of the load binder;

a transmission member having a shaft extending along an axis of rotation of the transmission member and transmission elements carried on the shaft and projecting outwardly therefrom for meshing with the teeth of the ratchet gear, the transmission member being supported on the mounting frame so as to be rotatable about the axis of the transmission member;

the mounting frame comprising a first portion and a second portion which is separable from the first portion in a separated condition of the mounting frame;

each of the first and second portions defining a mounting hole sized and shaped so as to receive the body of the load binder therethrough;

the first portion of the mounting frame carrying the transmission member in the separated condition;

the second portion of the mounting frame being connectable to the first portion in a mounted condition of the frame in which the first and second portions are located on either side of the ratchet gear and are connected across the ratchet gear so as to form an enclosure surrounding the ratchet gear.

In one arrangement, the first and second portions of the mounting frame define the mounting holes which are closed in shape such that the first and second portions are received on the body by longitudinal movement from one of the opposite ends of the body of the load binder towards the ratchet gear so as to be located at substantially longitudinally opposite locations of the ratchet gear in the mounted condition.

In another arrangement, the first and second portions of the mounting frame define the mounting holes which are open in shape such that the first and second portions are received on the body by transverse movement to a common longitudinal location of the body.

According to yet another aspect of the invention there is provided a load binder attachment for the ratchet-type load binder as described hereinbefore, comprising:

a mounting frame arranged for mounting to the load binder at a location registered with the ratchet mechanism;

a slot defined by the mounting frame and arranged to extend angularly of the axis of the ratchet gear so as to be adapted to receive the handle of the ratchet mechanism in the rotary movement relative to the body of the load binder;

a worm gear having a shaft extending along an axis of rotation of the worm gear and a helical flight carried on the shaft, the worm gear being supported on the mounting frame so as to be rotatable about the axis of the worm gear;

the worm gear being disposed at an angularly spaced location from the slot; and a coupler carried at one end of the shaft for connecting to a rotary drive member of a handheld power tool so as to drive rotation of the worm gear.

In the illustrated arrangement, there is provided a respective one of the coupler at each one of two longitudinally spaced apart opposite ends of the worm gear.

According to a further aspect of the invention there is provided a load binder attachment for the ratchet-type load binder as described hereinbefore, comprising:

a mounting frame arranged for mounting to the load binder at a location registered with the ratchet mechanism;

a slot defined by the mounting frame and arranged to extend angularly of the axis of the ratchet gear so as to be adapted to receive the handle of the ratchet mechanism in the rotary movement relative to the body of the load binder;

a sprocket with a shaft extending along an axis of rotation of the sprocket, the sprocket including a plurality of radially outwardly projecting teeth spaced angularly of the axis of rotation of the sprocket, the shaft being supported on the mounting frame so that the sprocket is rotatable about the axis thereof;

the sprocket being disposed at an angularly spaced location from the slot;

the sprocket being sized so as to carry a smaller number of teeth than the ratchet gear so that more than one rotation of the sprocket effects one rotation of the ratchet gear; and a coupler carried at one end of the shaft for connecting to a rotary drive member of a handheld power tool so as to drive rotation of the sprocket.

BRIEF DESCRIPTION OF THE DRAWINGS

The invention will now be described in conjunction with the accompanying drawings in which:

FIG. 4 is a diagrammatic side elevational view showing another arrangement of load binder attachment according to the present invention mounted on a ratchet-type load binder for tensioning a cable with spaced openings therealong, such as a chain, where some portions of either the load binder or the attachment are cutaway or omitted for clarity of illustration; and FIG. 5 is a cross-sectional view along line 5-5 in FIG. 4.

In the drawings like characters of reference indicate corresponding parts in the different figures. Also, it will be appreciated that hatching is used selectively for clarity of illustration in the cross-sectional views.

DETAILED DESCRIPTION

Figure 1:
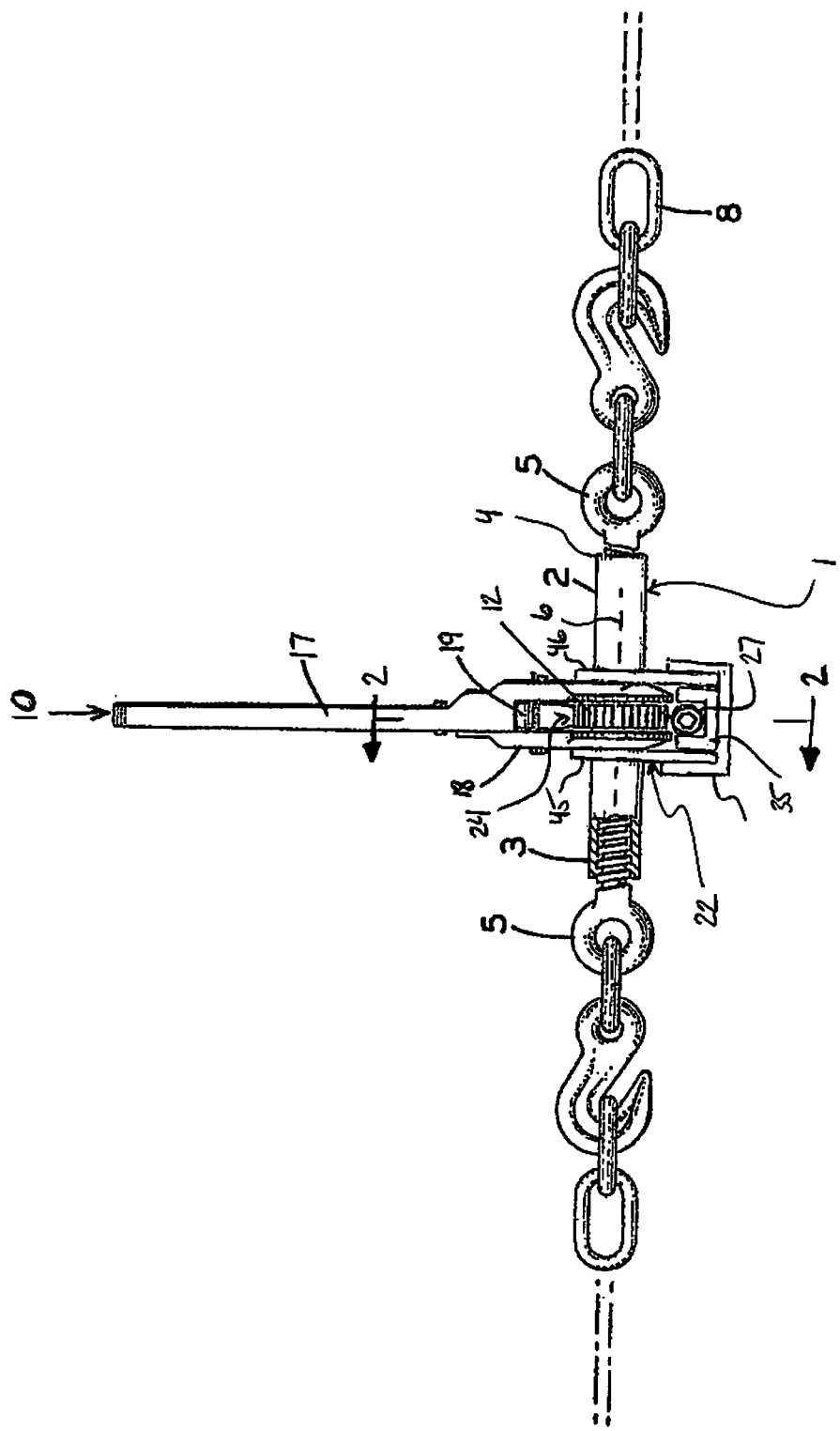
FIG. 1 is a diagrammatic side elevational view showing an arrangement of load binder attachment according to the present invention mounted on a ratchet-type load binder for tensioning a cable with spaced openings therealong, such as a chain.

The accompanying figures schematically illustrate a load binder attachment 20 for a ratchet-type load binder 1.

The load binder 1 has a longitudinally extending cylindrical tubular body 2 receiving at either opposite end thereof 3, 4 a movable attachment member 5 adapted for opposite movement to one another along a longitudinal axis 6 of the body for tensioning a cable 8 with spaced openings therealong to which the movable attachment 5 members are connected. The cable 8 is formed by a plurality of linked annular elements defining the spaced openings of the cable along its length, and thus one example of cable is a chain as illustrated.

The load binder 1 includes a ratchet mechanism 10 adapted to drive the opposite movement of the attachment members 5. The ratchet mechanism 10 includes a ratchet gear 12 defining a plurality of radially outwardly projecting teeth 13 around its circumference and mounted to the body 2 so that an axis 15 of the ratchet gear which is encircled by the teeth 13 is oriented coaxially but at the least parallel to the longitudinal axis 6 of the body 2. A plurality of recesses 16 are respectively defined between each adjacent pair of the teeth 13. A handle 17 of the ratchet mechanism 10 extends perpendicularly transversely from the body 1 at the location of the ratchet gear 12 and is on the body 2 for rotary movement relative thereto about the axis of rotation of the ratchet gear 15. That is, the handle has a generally U-shaped head 18 which straddles the ratchet gear 12, with an opening in either leg of the U-shaped handle head 18 receiving the tubular body 2. As the ratchet gear 12 is mounted in fixed relation to the body 2, the handle 17 is rotatable relative to the ratchet gear 12. A pawl 19 is operatively supported on the handle 17 for selectively engaging the ratchet gear 12 so that the rotary movement of the handle relative to the body 2 acts to drive the opposite movement of the attachment members 5. The pawl 19 has a pair of opposite engagement ends 19A and 19B so that rotation of the handle 17 in either rotational direction can act to drive movement of the attachment members 5, and thus drive both extension and retraction thereof.

Turning now to the attachment 20, the load binder attachment comprises a mounting frame 22 arranged for mounting to the load binder 1 at a location registered with the ratchet mechanism 10. Typically the mounting location of the frame 22 is coincident with the location of the ratchet gear 12 relative to the longitudinal axis 6 of the binder body 2.

A slot 24 is defined by the mounting frame 22 and extends angularly of the axis of the ratchet gear 15 so as to be adapted to receive the ratchet handle 17 in the rotary movement thereof relative to the binder body 2. In the illustrated arrangement the slot 24 is additionally registered with the ratchet gear 12 which is longitudinally coincident with the ratchet handle 17. The slot 24 allows for conventional manual operation of the binder using the ratchet handle 17 by not obstructing the stroke of same.

The attachment 20 further includes a transmission member 27 having a shaft 28 extending along an axis of rotation of the transmission member 30 and transmission elements 32 carried on the shaft 28 and projecting outwardly therefrom for meshing with the teeth 13 of the ratchet gear 12. The transmission member 27 is supported on the mounting frame 22 so as to be rotatable about the transmission member axis 30. In one arrangement shown in FIGS. 1-3, the transmission member 27 is a worm gear such that the transmission elements 32 are defined by a common helical flight helically extending along the shaft 28. As such, the axis of rotation 30 of the worm gear 27 is oriented tangentially to the circumference of the ratchet gear 12 in order for rotation of the worm gear 27 about its respective axis 30 to drive rotation of the ratchet gear 12 about its respective axis 15. In a second arrangement shown in FIGS. 4 and 5, the transmission member 27' comprises a sprocket, which is more similar in basic structure to ratchet gear 12, such that the transmission elements are defined by teeth 32' of the sprocket spaced angularly of the transmission member rotation axis 30' which is oriented parallel and coplanar to the ratchet gear axis 15 in order for rotation of the sprocket 27' to drive rotation of the ratchet gear 12 about its respective axis 15.

In either arrangement, the transmission member 27, 27' is disposed at an angularly spaced location from the slot 24 so as not to obstruct movement of the ratchet handle 17.

Furthermore, the attachment 20 includes at least one coupler 35 which is carried at a respective end of the shaft 28 of the transmission member for connecting to a rotary drive member of a handheld power tool (not shown) such as a cordless drill so as to drive rotation of the transmission member. Both arrangements show a coupler 35 at each one of two longitudinally spaced and opposite ends of the shaft 28 so that the handheld power tool can be located at either end of the shaft (for example, depending on accessibility of same) to drive rotation of the transmission member. These couplers 35 which are generally nut-shaped (like a nut fastener) are longer than conventional nuts so as to better retain the rotary drive member of the power tool when coupled thereto. Additionally, and particularly in the worm gear arrangement, the angularly spaced location of the worm gear 27 relative to the slot 24 along which the ratchet handle 17 travels enables the user to rest a handle of the handheld power tool against the ratchet handle 17 when same is positioned generally parallel to the worm gear axis 30, so that the ratchet handle 17 absorbs any torque in twisting of the power tool during operation to rotate the worm gear 27 as compared to the user's wrist.

Using the transmission member 27 rotatably coupled to a handheld power tool instead of the ratchet handle 17 to drive rotation of the ratchet gear 12 greatly expedites the rate of opposite longitudinal movement of the binder attachment members 5. However, in certain circumstances the handheld power tool may be unavailable to drive the load binder 1 via the attachment 20, and therefore the attachment 20 should be arranged to enable use of the ratchet handle 17 to operate the load binder without having to remove the attachment 20 from the load binder body 2.

Figure 2:
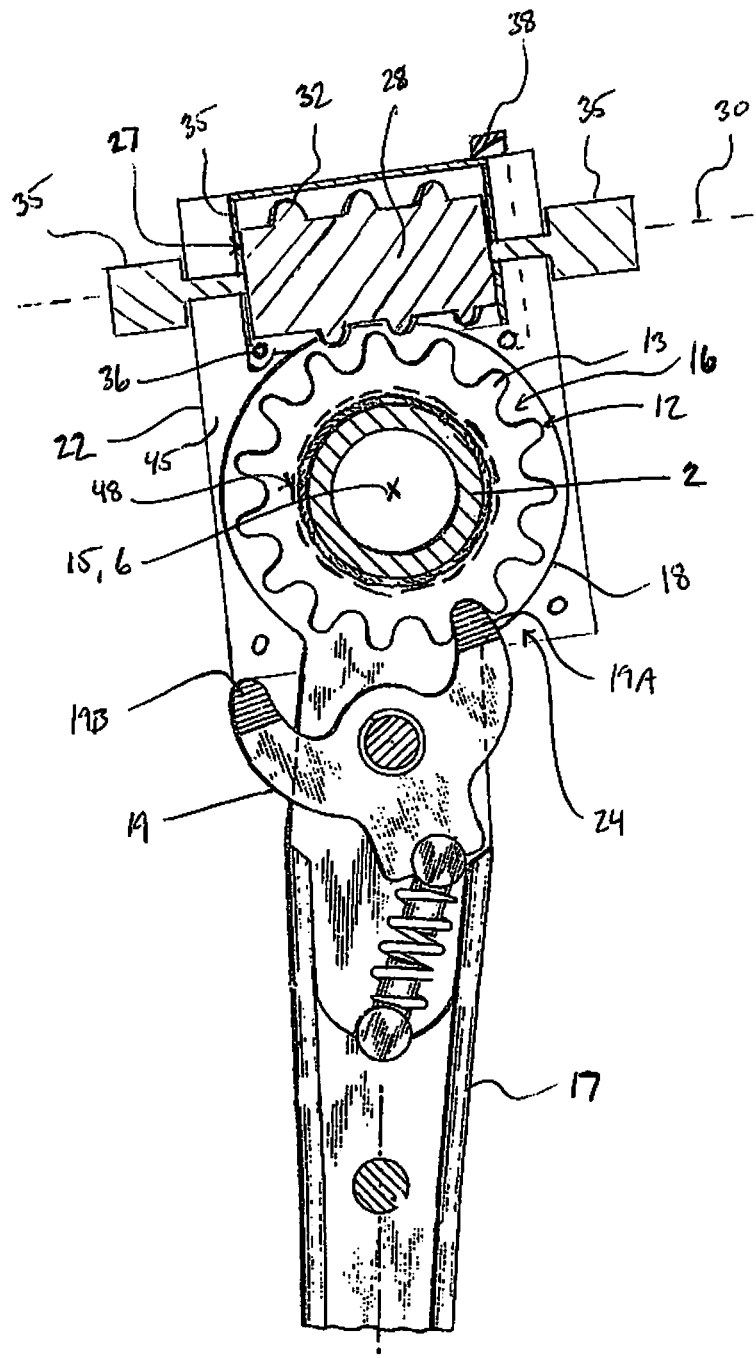
FIG. 2 is cross-sectional view along line 2-2 in FIG. 1 but shown in inverted orientation relative thereto.

As such, the transmission member 27 or 27' is movable between a drive position like that shown in FIGS. 2 and 4 in which the transmission elements 32, 32' are arranged at a location for contacting the teeth 13 of the ratchet gear 12 and effecting rotation of the ratchet gear 12 upon the rotation of the transmission member. That is, in the drive position the transmission elements 32, 32' are located in the recesses 16 of the ratchet gear 12 so as to mesh with the teeth 13 thereof such that the rotation of the transmission member 27, 27' effects rotation of the ratchet gear 12. As such, when the transmission elements 32, 32' are meshed with the teeth 13 of the ratchet gear 12 in the drive position, the ratchet handle 17 is prevented from rotating the ratchet gear 12, just like if the pawl 19 is engaged with the ratchet gear 12 when it is desired to use the transmission member 27. Therefore the transmission member is movable from the drive position to an idle position in which the transmission elements 32, 32' are arranged to be at spaced locations from the recesses 16 so as to be free from meshing with the teeth 13 of the ratchet gear 12. Thus the ratchet gear 12 can rotate freely of the transmission member 27, 27'. As such, the transmission member 27, 27' is selectively engageable with the ratchet gear 12 for selectively driving the opposite movement of the attachment members 5 of the load binder 1.

It will be further appreciated that since the binder body 2 rotates with the ratchet gear 12 in the illustrated arrangement, the mounting frame 22 is mounted to the binder body 2 in a manner so that the body 2 can rotate relative thereto.

In the arrangement with the worm gear 27, the worm gear 27 is rotatably supported on a carrier frame 35 which is, for example, an inverted U-channel with rotational bearings interconnecting the shaft 28 and the frame 35, that is pivotally supported on the mounting frame 20 such that the worm gear 27 is arranged for pivotal movement between the drive and idle positions about a pivot axis, which is defined at transverse pin 36, spaced from the ratchet gear axis 15 but oriented parallel thereto and coplanar therewith. The worm gear 27 is biased to the idle position such as by a spring, and a retention element 38 is movably mounted on the mounting frame 22 to selectively retain the transmission member in the drive position. In the first arrangement, the retention element comprises an inverted U-shaped cap which is pivotally carried on the mounting frame at a spaced location from the pivot axis 36 and is movable from a blocking position such as that shown in FIG. 2 where the cap 38 is in engagement with a top surface defined by the carrier frame 35 and exposed at a top of the mounting frame 22, to an unlocked position as shown in FIG. 3 where the retention cap 38 is disposed outside the pivotal path of movement of the carrier frame 35 between the drive position and the idle position.

In the second arrangement with the sprocket 27', the sprocket 27' may be movable between the drive and idle positions in linear movement along slots 40 (shown in phantom in FIG. 5) extending transversely to the ratchet gear axis 15, and the retention element comprises a pivotally supported tab 42 which is movable from a blocking position in which it is disposed in overlapping condition with the slots 40 to an unlocked condition in which the tab 42 is spaced from the slots 40.

Still referring to FIGS. 4 and 5, the sprocket 27' is sized smaller than the ratchet gear 12 so as to carry a smaller number of teeth than the ratchet gear 12, so that more than one rotation of the sprocket 27' effects one rotation of the ratchet gear 12.

Figure 3:
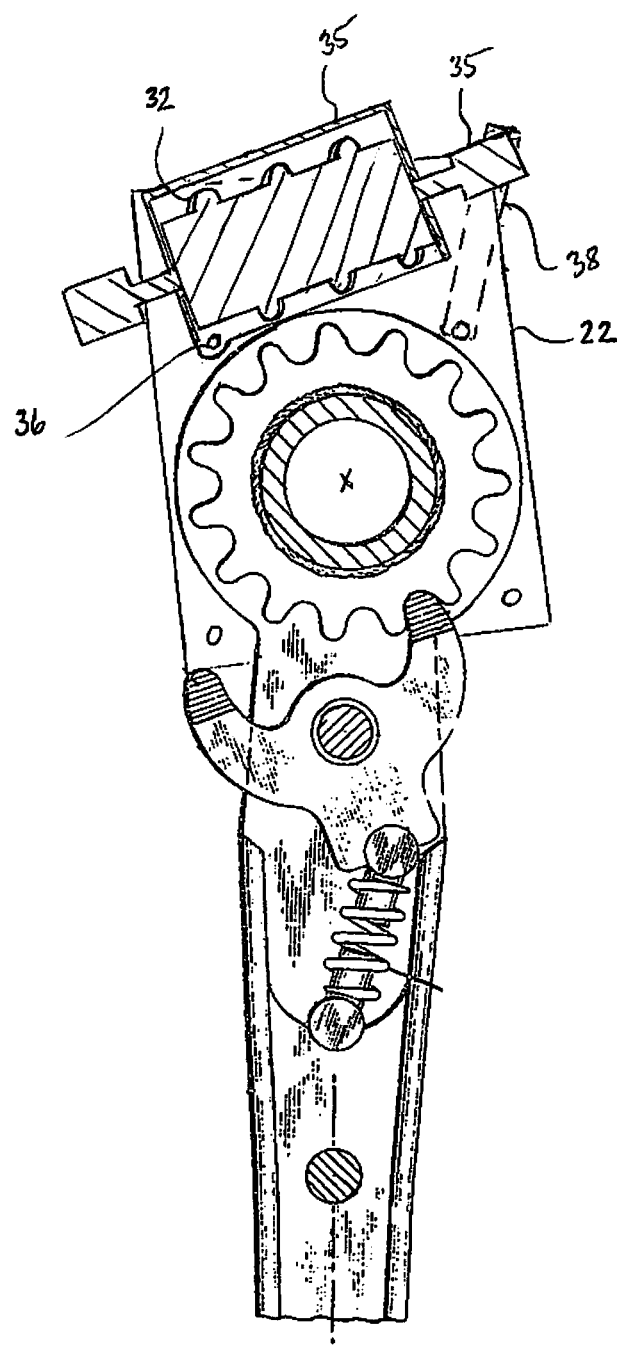
FIG. 3 is a cross-sectional view like FIG. 3 but showing a transmission member of the arrangement of load binder attachment in an idle position.

The worm gear 27 of FIGS. 1-3 is sized so that about 15 rotations of the worm gear yield one rotation of the ratchet gear, so that less torque may be employed to tighten the load binder by retracting its attachment members 5.

The mounting frame 22 of either arrangement comprises a first portion 45 and a second portion 46 which is separable from the first portion 45 in a separated condition of the mounting frame. Each of the first and second portions define a mounting hole 48 sized and shaped so as to receive the body 2 of the load binder therethrough. The first portion 45 of the mounting frame carries the transmission member 27 in the separated condition, and the second portion 46 of the mounting frame is connectable to the first portion 45 in a mounted condition of the frame 22 in which the first and second portions 45, 46 are located on either side of the ratchet gear 12 and are connected across the ratchet gear so as to form an enclosure surrounding the ratchet gear.

In the first arrangement as shown in FIGS. 1-3, the first and second portions 45, 46 of the mounting frame define the mounting holes 48 which are closed in shape, for example annular, such that the first and second portions are received on the body by longitudinal movement from one of the opposite ends 3, 4 of the load binder body 2 towards the ratchet gear 12 so as to be located at substantially longitudinally opposite locations of the ratchet gear in the mounted condition. As such, the first and second portions for example are defined by a pair of plates which are interconnected in longitudinally spaced relation. The first portion 45 carries the carrier frame 35 and the second portion 46 caps off an exposed side of the carrier frame opposite to the first portion 45.

In the second arrangement as shown in FIGS. 4 and 5, the first and second portions 45', 46' of the mounting frame define the mounting holes 48' which are open in shape, so as to be open at the periphery of the respective portion of the mounting frame, such that the first and second portions 45', 46' are received on the body 2 by transverse movement to a common longitudinal location of the body 2. The first and second portions 45', 46' define substantially enclosed housings which mate together around the ratchet gear 12 so as to mount to the binder body 2. The substantially enclosed housings 45', 46' are formed for example by a pair of parallel plates joined in spaced relation by a transversely oriented plate interconnecting the parallel plates at or adjacent their periphery.

As such, the attachment 20 is a distinct entity which is removably attachable to the load binder 1, which is typically an existing product in the possession of the user. This existing load binder can readily accept the attachment 20 which mounts to the binder body 2 in a manner so that the transmission member 27 is locatable in meshing relation with the ratchet gear 12.

An attachment for a ratchet-type load binder as described herein generally comprises a mounting frame arranged for mounting to the load binder at a location registered with a ratchet mechanism thereof, a slot defined by the mounting frame and arranged to extend angularly of the axis of the ratchet gear so as to be adapted to receive a handle of the ratchet mechanism in rotary movement relative to a body of the load binder, and a transmission member having a shaft extending along an axis of rotation of the transmission member and transmission elements carried on the shaft and projecting outwardly therefrom for meshing with the teeth of the ratchet gear. It is one aspect of the invention that the transmission member is movable from a drive position in which the transmission member meshes with the ratchet gear to an idle position in which the ratchet gear can rotate freely of the transmission member, so that conventional operation of the ratchet mechanism with the handle is still available without removing the attachment. It is another aspect of the invention that the mounting frame has a pair of separable portions so that the attachment can be mounted to an existing load binder by connection of the separable portions to one another when respectively located on the body of the load binder.

The scope of the claims should not be limited by the preferred embodiments set forth in the examples but should be given the broadest interpretation consistent with the specification as a whole.

The invention claimed is:

1. A load binder attachment for a ratchet-type load binder having a longitudinally extending tubular body receiving at either opposite end thereof a movable attachment member of the load binder adapted for opposite movement to one another along a longitudinal axis of the body for tensioning a cable to which the movable attachment members are connected, the cable being formed by a plurality of linked annular elements, the load binder including a ratchet mechanism adapted to drive the opposite movement of the attachment members, the ratchet mechanism including a ratchet gear defining a plurality of radially outwardly projecting teeth around its circumference and mounted to the body so that an axis of the ratchet gear which is encircled by the teeth is oriented parallel to the longitudinal axis of the body and such that rotation of the ratchet gear about the axis thereof effects the opposite movement of the attachment members, a plurality of recesses respectively being defined between each adjacent pair of the teeth, a handle of the ratchet mechanism extending transversely from the body and supported thereon for rotary movement relative to the body about the axis of the ratchet gear, and a pawl operatively supported on the handle for selectively engaging the ratchet gear so that the rotary movement of the handle relative to the body acts to drive the opposite movement of the attachment members, in combination with the load binder, the load binder attachment comprising:

a mounting frame mounted to the load binder at a location registered with the ratchet mechanism;

a slot in the mounting frame and extending angularly of the axis of the ratchet gear, the slot receiving the handle of the ratchet mechanism and being sized greater than a width of the handle so that the handle can traverse the slot in the rotary movement thereof relative to the body of the load binder;

a transmission member having a shaft extending along an axis of rotation of the transmission member and transmission elements carried on the shaft and projecting outwardly therefrom for meshing with the teeth of the ratchet gear, the transmission member being supported on the mounting frame so as to be rotatable about the axis of the transmission member;

a coupler carried at one end of the shaft of the transmission member for connecting to a rotary drive member of a handheld power tool so as to drive rotation of the transmission member;

the transmission member being movable between a drive position in which the transmission elements are located in the recesses of the ratchet gear so as to mesh with the teeth thereof, such that the rotation of the transmission member effects rotation of the ratchet gear, and an idle position in which the transmission elements are at spaced locations from the recesses so as to be free from meshing with the teeth, such that the transmission member is selectively engageable with the ratchet gear for selectively driving the opposite movement of the attachment members of the load binder.

2. The load binder attachment of claim 1 wherein the transmission member is disposed at an angularly spaced location from the slot.

3. The load binder attachment of claim 1 wherein the transmission member is a worm gear such that the transmission elements are defined by a helical flight, and in the drive position the axis of rotation of the worm gear is oriented so as to be substantially tangential to the circumference of the ratchet gear.

4. The load binder attachment of claim 3 wherein the worm gear is arranged for pivotal movement between the drive and idle positions.

5. The load binder attachment of claim 4 wherein a pivot axis about which the worm gear is pivotal in the movement between the drive and idle positions is spaced from the axis of the ratchet gear and is oriented substantially parallel thereto.

6. The load binder attachment of claim 1 wherein the transmission member comprises a sprocket such that the transmission elements are defined by teeth of the sprocket spaced angularly of the axis of rotation of the transmission member, and in the drive position the axis of rotation of the transmission member is oriented so as to be substantially parallel to and substantially coplanar with the axis of the ratchet gear.

7. The load binder attachment of claim 1 wherein the transmission member is biased to the idle position and the load binder attachment further includes a retention element movably mounted on the mounting frame to selectively retain the transmission member in the drive position.

8. The load binder attachment of claim 1 wherein there is provided a respective one of the coupler at each one of two longitudinally spaced and opposite ends of the shaft.

9. A load binder attachment for a ratchet-type load binder having a longitudinally extending tubular body receiving at either opposite end thereof a movable attachment member of the load binder adapted for opposite movement to one another along a longitudinal axis of the body for tensioning a cable to which the movable attachment members are connected, the cable being formed by a plurality of linked annular elements, the load binder including a ratchet mechanism adapted to drive the opposite movement of the attachment members, the ratchet mechanism including a ratchet gear defining a plurality of radially outwardly projecting teeth around its circumference and mounted to the body so that an axis of the ratchet gear which is encircled by the teeth is oriented parallel to the longitudinal axis of the body, a plurality of recesses respectively being defined between each adjacent pair of the teeth, a handle of the ratchet mechanism extending transversely from the body and supported thereon for rotary movement relative to the body about the axis of the ratchet gear, and a pawl operatively supported on the handle for selectively engaging the ratchet gear so that the rotary movement of the handle relative to the body acts to drive the opposite movement of the attachment members, the load binder attachment comprising:

a mounting frame arranged for mounting to the load binder at a location registered with the ratchet mechanism;

a slot in the mounting frame and arranged to extend angularly of the axis of the ratchet gear so as to be adapted to receive the handle of the ratchet mechanism in the rotary movement relative to the body of the load binder;

a worm gear having a shaft extending along an axis of rotation of the worm gear and a helical flight carried on the shaft, the worm gear being supported on the mounting frame so as to be rotatable about the axis of the worm gear and relative to the mounting frame for engaging the ratchet gear of the load binder;

the worm gear being disposed at an angularly spaced location from the slot; and a coupler carried at one end of the shaft for connecting to a rotary drive member of a handheld power tool so as to drive rotation of the worm gear and, in turn, a rotation of the ratchet gear.

10. The load binder attachment of claim 9 wherein there is provided a respective one of the coupler at each one of two longitudinally spaced and opposite ends of the worm gear.

11. A load binder attachment for a ratchet-type load binder having a longitudinally extending tubular body receiving at either opposite end thereof a movable attachment member of the load binder adapted for opposite movement to one another along a longitudinal axis of the body for tensioning a cable to which the movable attachment members are connected, the cable being formed by a plurality of linked annular elements, the load binder including a ratchet mechanism adapted to drive the opposite movement of the attachment members, the ratchet mechanism including a ratchet gear defining a plurality of radially outwardly projecting teeth around its circumference and mounted to the body so that an axis of the ratchet gear which is encircled by the teeth is oriented parallel to the longitudinal axis of the body, a plurality of recesses respectively being defined between each adjacent pair of the teeth, a handle of the ratchet mechanism extending transversely from the body and supported thereon for rotary movement relative to the body about the axis of the ratchet gear, and a pawl operatively supported on the handle for selectively engaging the ratchet gear so that the rotary movement of the handle relative to the body acts to drive the opposite movement of the attachment members, in combination with the load binder, the load binder attachment comprising:

a mounting frame distinct from and removably attached to the load binder at a location registered with the ratchet mechanism;

a slot in the mounting frame and extending angularly of the axis of the ratchet gear, the slot receiving the handle of the ratchet mechanism and being sized greater than a width of the handle so that the handle can traverse the slot in the rotary movement thereof relative to the body of the load binder;

a sprocket with a shaft extending along an axis of rotation of the sprocket, the sprocket including a plurality of radially outwardly projecting teeth spaced angularly of the axis of rotation of the sprocket, the shaft being supported on the mounting frame so that the sprocket is rotatable about the axis thereof and relative to the mounting frame for engaging the ratchet gear of the load binder;

the sprocket being disposed at an angularly spaced location from the slot and the handle relative to the axis of the ratchet gear;

the sprocket having a smaller number of teeth than the ratchet gear so that more than one rotation of the sprocket effects one rotation of the ratchet gear; and a coupler carried at one end of the shaft for connecting to a rotary drive member of a handheld power tool so as to drive rotation of the sprocket and, in turn, the rotation of the ratchet gear.

* * * * *